United States Patent
Kozima

(10) Patent No.: US 6,254,075 B1
(45) Date of Patent: Jul. 3, 2001

(54) TABLE FEED MECHANISM FOR MACHINE TOOL

(75) Inventor: Gaku Kozima, Osaka (JP)

(73) Assignee: Shinnippon Koki Kabushiki Kaisha (Shinnippon Koki Co., Ltd.), Osaka-fu (JP)

(*) Notice: Subject to any disclaimer, the term of this patent is extended or adjusted under 35 U.S.C. 154(b) by 0 days.

(21) Appl. No.: 08/926,717

(22) Filed: Sep. 10, 1997

(30) Foreign Application Priority Data

Sep. 24, 1996 (JP) .................................................. 8-251514

(51) Int. Cl.⁷ ...................................................... B23Q 3/18
(52) U.S. Cl. .................................................. 269/73; 269/60
(58) Field of Search .................................. 269/60, 61, 72

(56) References Cited

U.S. PATENT DOCUMENTS

| | | | |
|---|---|---|---|
| 3,290,039 | * 12/1966 | Lancaster | 269/60 |
| 3,801,090 | * 4/1974 | Gillen | 269/60 |
| 5,165,296 | 11/1992 | Yanagisawa . | |
| 5,311,791 | 5/1994 | Yanagisawa . | |
| 5,370,214 | 12/1994 | Katahira . | |
| 5,407,184 | * 4/1995 | Shoda | 269/60 |
| 5,468,101 | * 11/1995 | Shoda | 269/60 |

FOREIGN PATENT DOCUMENTS 9-42406   2/1997  (JP) .

* cited by examiner

Primary Examiner—David A. Scherbel
Assistant Examiner—Lee Wilson
(74) Attorney, Agent, or Firm—Jordan and Hamburg LLP

(57) ABSTRACT

This invention relates to a table feed mechanism of the machine tool. The table feed mechanism of this invention includes a bed; a table slidably mounted on the bed for mounting a work thereon and for defining a plurality of screw holes therein; a plurality of feed screw shafts engageable with the screw holes respectively; and a drive mechanism for simultaneously driving the feed screw shafts to move the table.

12 Claims, 3 Drawing Sheets

TABLE FEED MECHANISM FOR MACHINE TOOL

BACKGROUND OF THE INVENTION

This invention relates to a table feed mechanism for a machine tool. In the conventional machine tools where a relative position of work to a tool can be determined along a plural directions (i.e., a X-dir.; a Y-dir.; and a Z-dir.), there are several types of machine tools; one of the types is to drive a tool along the three directions (XYZ-dirs.) and another type is to drive the tool along the two of the directions (for instance YZ-dirs.) and to drive a table for mounting the work along the rest of the direction (for instance X-dir.). In the machine tool of the latter one, it is commonly the case that a nut is fixedly mounted on the table and a feed screw shaft is provided to engage with the inner thread of the nut and then the table is fed by driving the feed screw shaft.

With the aforementioned type of table feed mechanism to feed the table and the work mounted thereon, it is likely the case that the screw shaft is subjected to a great magnitude of tension or compression load due to the inertia force caused by the weight of the object to be fed (including the table and the work) at the time of the acceleration or deceleration operation of the feeding operation. This tension or compression force generated on the feed screw shaft causes the deflection of the shaft that generates an undesirable error in the work path in a non-negligible order. In addition, the inertia force generated on the shaft especially when the shaft being subjected to the acute acceleration and deceleration could also cause the torsional deflection on the shaft. And this torsional deflection of the shaft in turn produces the error in the actual position of the table because of the angular phase position of the drive shaft of the motor will be affected by the torsional deflection.

In order to solve the aforementioned problem of the conventional feeding mechanism of the machine tool, it is natural for the person with ordinary skill in the art to think that increasing the rigidity (including rigidity against the torsional deflection and the rigidity against the bending deflection) of the feed screw shaft to basically strengthen the feed shaft. Furthermore, it is quite natural to think that to gain more rigidity, increasing the diameter of the screw shaft is the simple way. However, the moment of inertia is proportional to the fourth power of the diameter of the torsional shaft, thus slight increase of the diameter of the shaft may significantly increase the moment of inertia. As a result, significantly increased drive power would be required for the motor to drive the thickened screw shaft especially when at accelerating and decelerating procedures. Thus it may necessitate a procurement of a non-standard type larger motor for this purpose, leading a cost increase for the machine tool as a whole and cost reflection upon the products made by the machine tool.

SUMMARY OF THE INVENTION

In view thereof, an object of this invention is to provide the feeding mechanism suppressing a significant increase of the required drive load of the screw shaft while maintaining the accuracy in feeding the relatively heavy table and the work mounted thereon.

In order to meet the above object, the table feed mechanism of the machine tool, according to this invention, comprises: a bed; a table slidably mounted on the bed for mounting a work thereon and for forming a plurality of screw holes therein; a plurality of feed screw shafts engageable with the screw holes respectively; a drive means for simultaneously driving the feed screw shafts to move the table.

With the thus constructed table feed mechanism, the tension or compression force, generated by the inertia of the table and the work both combined when being accelerated or decelerated, is distributed to act upon each feed screw shaft. Thus the tension or compression force that each feed screw shaft must bear is greatly lowered as compared to the case when the single feed screw shaft is equipped as for the conventional machine tool. As a result, a feed motion of the table and work mounted thereon is accurately controlled. Furthermore, a momentum load subjected to the drive member such as a motor is not increased as much as the case when increasing the diameter of the feed screw shaft, thus it enhances an availability of employment of the ordinary motor of smaller size to drive each feed screw shaft.

These and other objects, features and advantages of the present invention will become more apparent upon reading the following detailed description with reference to accompanied drawings.

DETAILED DESCRIPTION OF THE PREFERRED EMBODIMENTS

Hereinafter the preferred embodiment according to this invention will be described with reference to the drawings.

Figure 1:
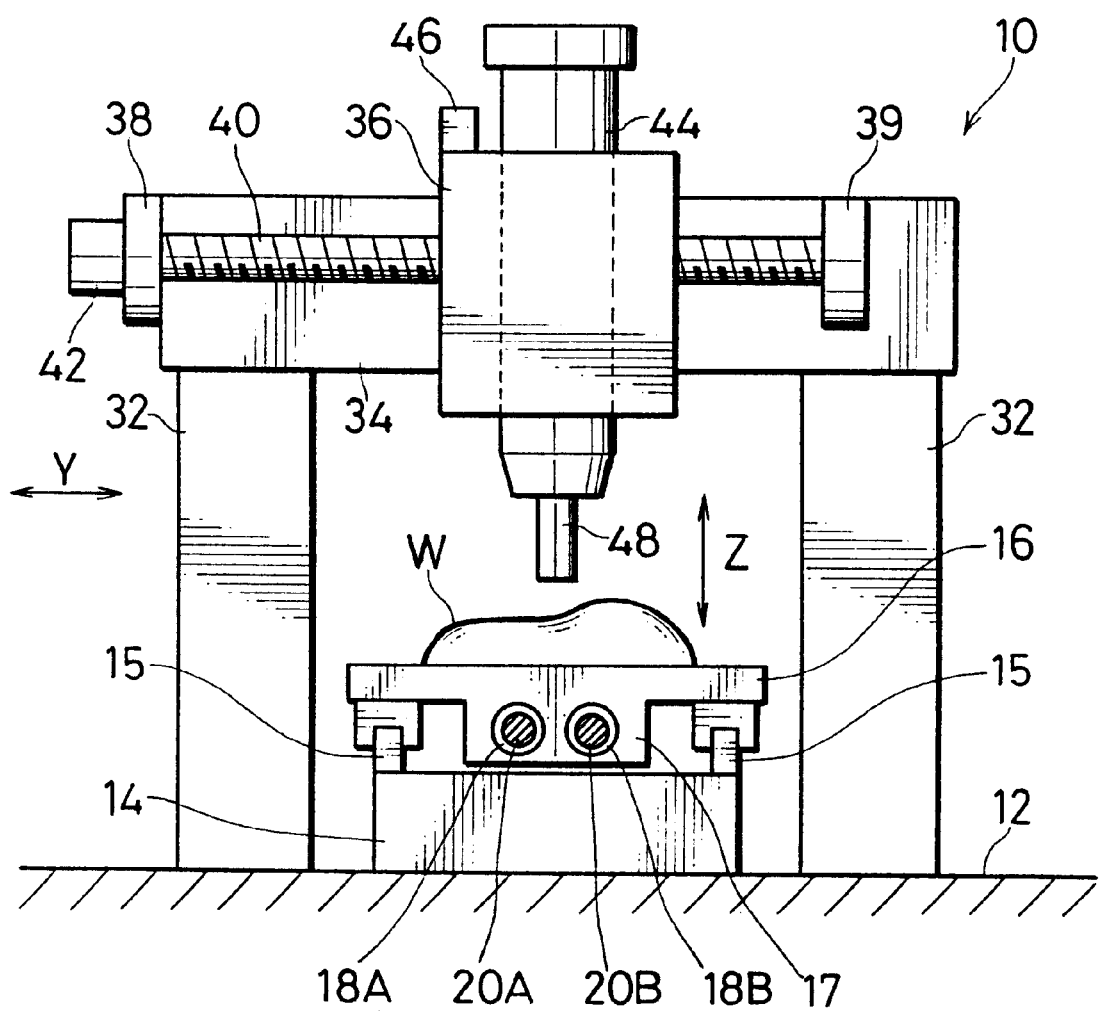
FIG. 1 is a cross sectional front view of a machine tool of this invention.
Figure 2:
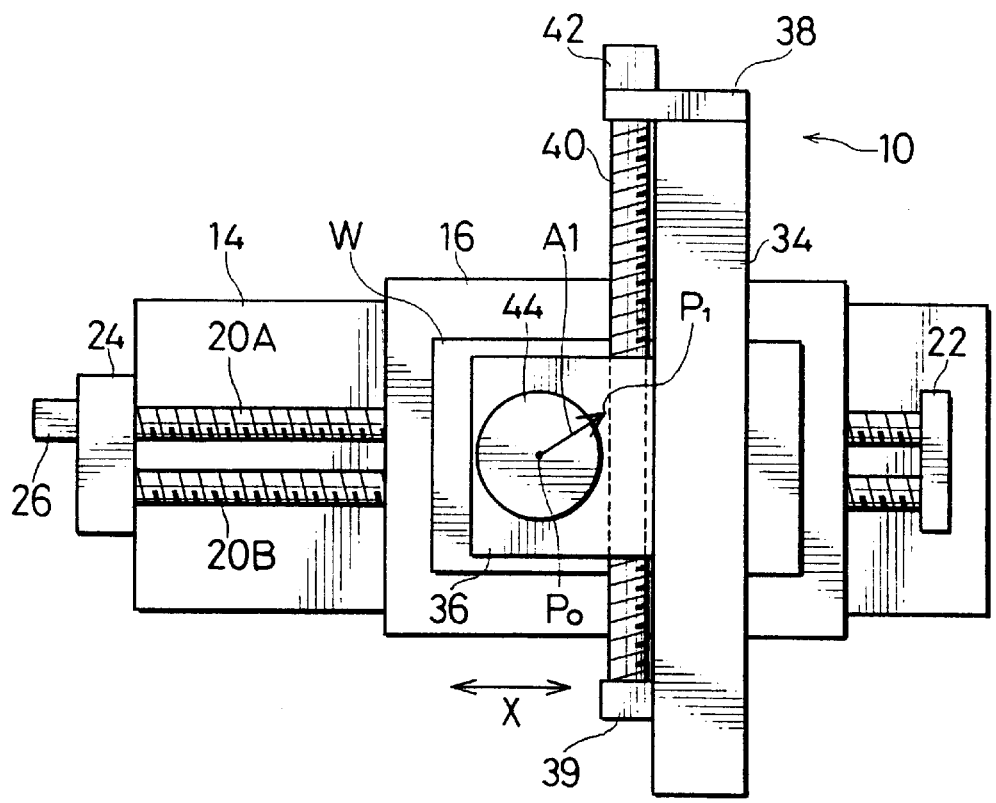
FIG. 2 is a plan view of the machine tool.
Figure 3:
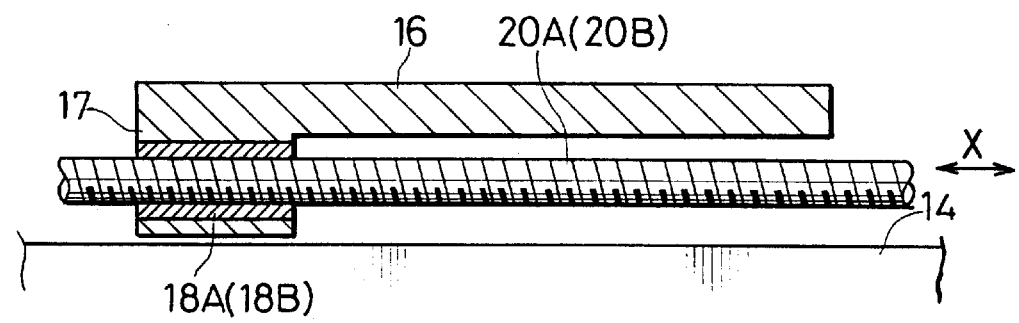
FIG. 3 is a cross sectional side view showing an essential portion of the machine tool.

With reference to FIGS. 1, 2, and 3, a machine tool 10 has a bed 14 supported on a base 12. A right and left pair of guide rails 15 are disposed on the bed 14. A table 16 for supporting a work is horizontally slidably (in a X-dir. in FIG. 2) supported on the guide rails 15.

A frontal end of the table 16 (left end in FIGS. 2 and 3) has a nut mounting portion 17 projecting downward and a right and left pair of nuts 18A, 18B are fixedly mounted on the side surface of the nut mounting portion 17. Two of feed screw shafts (preferably a ball screw shaft) 20A, 20B in horizontally extending posture are set to engage with the respective nuts 18A, 18B. The left feed screw shaft and the right feed screw shaft in FIG. 1 may be identical with each other or substantially the same configuration. The screw shafts are parallely extending along the X-direction as shown in FIG. 2.

As shown in FIG. 2, these feed screw shafts 20A, 20B are rotatably supported by a bearing portion 22 provided on a right end of the bed 14. The other ends of the feed screw shafts 20A, 20B are coupled to a X-direction drive motor 26 that is to drive the feed screw shafts via a gear box 24.

Figure 4:
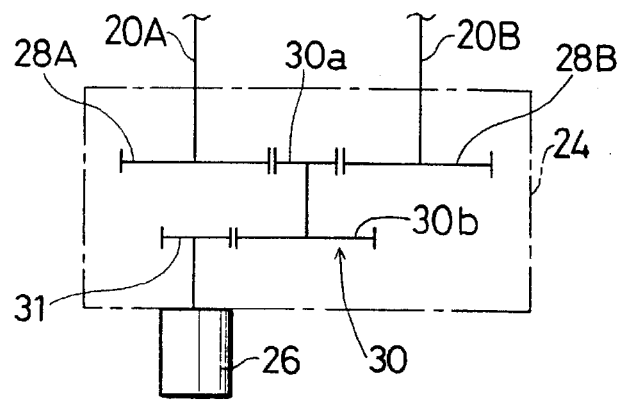
FIG. 4 is a schematic diagram showing an internal structure of a gear box mounted to the machine tool.

An inner structure of the gear box 24 is shown in FIG. 4. The both screw shafts 20A, 20B are rotatably supported by a housing of the gear box 24 and the substantially the same gears 28A, 28B are fixedly mounted on the ends of the both shafts. In the gear box 24, there is provided a double gear 30 having a pinion gear 30a on the one end and a gear 30b on the other end. The pinion gear 30a is disposed between the gears 28A, 28B to mesh with both gears 28A, 28B. In addition, the gear 30b is set to mesh with a pinion gear 31 mounted on an output shaft of the X-direction motor 26.

Accordingly when the X-direction motor 26 is actuated, then a drive of the motor 26 is transmitted to the pinion gear 30a through the pinion gear 31 and the gear 30b, then to the gears 28A & 28B. Then the feed screw shafts 20A, 20B are to be driven by the gears 28A, 28B respectively. In the case of identical pinion gears selected for gears 28A and 28B, the same rotational speed is achieved for the feed screw shafts 20A and 20B.

As shown in FIG. 1, there are a pair of upstanding pillars 32, 32 on the left and right sides of the bed 14 and a cross beam 34 extending horizontally in the Y-direction is supported on the pillars. A saddle 36 for a main shaft head is supported on this cross beam 34 and the saddle 36 is slidable along the longitudinal direction (i.e., the Y-dir.) of the cross beam 34. Opposite sides of the cross beam 34 along the longitudinal direction have a gear box 38 on the left and a bracket 39 on the right respectively. Opposite ends of a parallely extending feed screw shaft 40 are rotatably supported by the gear box 38 and the bracket 39 respectively. The feed screw shaft 40 extends through a nut (not shown) fixed on a rear surface of the main shaft head saddle 36 and is set to engage with the nut. Accordingly the feed screw shaft 40 is set to be driven by a Y-direction motor 42 provided on the side of the gear box 38 to feed the main shaft head saddle 36 along the longitudinal direction of the cross beam 34.

A main shaft header 44 is supported by the main shaft head saddle 36 in such a manner that the main shaft header 44 is vertically displaceable (i.e., movable along the Z-dir.) with respect to the main shaft head saddle 36. This main shaft header 44 is set to be driven in the vertical direction (Z-dir.) by a Z-direction motor 46 and a feed screw mechanism (not shown). The main shaft header 44 has a chucking mechanism at its bottom for chucking a tool such as ball end mill 48 and the like. As a result, the tool 48 of this machine tool is adjustable its position with respect to the work placed on the table 16 along the X, Y, and Z directions in a three dimensional coordinate by activation of each of the X-direction motor 26, the Y-direction motor 42, and the Z-direction motor 46 respectively.

As described in the above passages, the machine tool 10 can halve a magnitude of a tension or a compression force acting on each feed screw shaft 20A or 20B that is generated by the inertia force due to the weight of the work and table 16 that are subjected to the velocity changes such as when they are accelerated or decelerated as compared to the case in the conventional mechanism where there is a single feed screw shaft. Thereby the deflection amount in terms of bending and torsional forces of each feed screw shaft 20A or 20B can be greatly reduced. With the thus described machine tool 10, the accurate positioning of the tool with respect to the table in turn precision machining can be realized even when the total weight of the object to be fed (including the work and the table 16) by the feed screw shafts is heavy, .i.e., the inertia force thereof is large.

Figure 5:
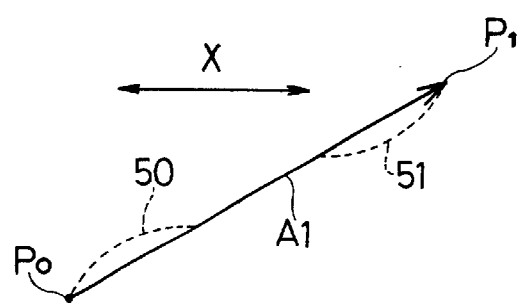
FIG. 5 is a diagram showing one of the examples of feed instruction to the table and work.

Take the following case as an example to show how the table of the machine tool 10 is to be positioned with reference to FIG. 2. Let us assume the case when a programming instruction, linearly moving the main header 44 and the tool 48 from the present point $P_0$ to a point $P_1$, is given. Then with the conventional machine tool with a single feed screw shaft for the table, the feed screw shaft is deflected because of the inertia force of the object to be fed (incl. table and work) and the velocity changes at the initiation of the feed operation and at the end of the feed operation (i.e., acceleration at the former case and the deceleration at the latter case); therefore, the accurate positioning of the table 16 along the X-direction can not be realized, causing to move the table along the curved path (shown in dotted lines 50, 51 in FIG. 5) instead of following the linear path indicated at A1. With the feed mechanism with the two or more than two feed screw shafts according to this invention, the deflection of the screw shafts for each is effectively suppressed under the circumstance when the table is subjected to the velocity changes at the beginning and at the end of the feed motion, thus accurate feed control operation in response to the given program instruction is realized, resulting in the precise machining operation.

Furthermore, in the case where the diameter of the feed screw shaft is increased in an attempt to suppress the deflection amount of the feed screw shaft when encountering velocity change; however, the fact of increasing the diameter of the feed screw shaft significantly affects the magnitude of the inertia force as the change in the inertia force is proportional to the fourth power of the radius (diameter) of the shaft, i.e., when the radius is doubled, then the inertia force becomes 16 times greater than its original. Thus merely increasing the smaller amount in radius may greatly increase the magnitude of the inertia force that may in turn subject the motor to overcome the greater load at the beginning and end of the motion when the velocity change takes place. In this case, it is highly likely that the present motor of its smaller conventional size is not suffice thereby it requires a use of higher powered motor that may not be readily available on the market. Thus use of the customized motor for driving the table will result in cost increase of the tool machine as a whole and cost reflection upon each of machined products produced by the machine tool.

Another Embodiments

This invention is not limited to the structure described in the above passages, in fact, the followings are selected examples of modifications of this invention.

(1) It may be possible to equip a motor to each feed screw shaft thus the same number of the motors as the number of feed screw shafts are to be equipped. In this way, even if the total moment load subjected to the motor increases the certain level, say beyond the maximum load handled by a single standardized motor readily available on the market, the same motor can be equipped to assist the excess load thus it will not necessitate the customized motor (maybe more expensive than the two or three standardized smaller motors all together). However, it is obvious that providing the same gears (in size and pitch) on the both ends of the feed screw shafts 20A, 20B and disposing a pinion gear 30a the is connected to a drive shaft of the single X-direction motor 26 for engageable with both gears 28A, 28B to drive the both shafts 20A, 20B is more desirable in terms of cost and simplicity of the structure. Furthermore, synchronizing operation of the two shafts with a single driver (in this case single X-direction motor and its gear trains) is much easier and eliminate all those parts that would have been needed to synchronize the motion of the shafts when two motors were used. Thus it would be advantageous to use a single motor to drive the plurality of feed screws shafts.

(2) Furthermore orientations of the two feed screw shafts 20A, 20B may be such that they are in parallel and are vertically apart from one to the other. However this orientation may cause the table 16 to be much thicker in a vertical direction to accommodate the two feed screw shafts vertically therein. A height increase of the machine tool may result. Whereas the horizontally parallel orientations of two shafts 20A, 20B do not usually necessitate the increase a size of the table in widthwise direction as the table has usually a wider dimension in widthwise direction. Thus it is more advantageous to place the two shafts in horizontally parallel posture.

Figure 6:
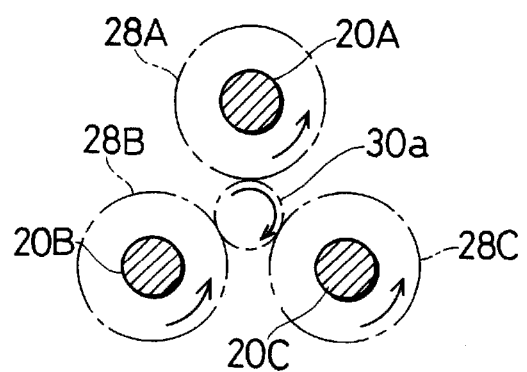
FIG. 6 is a cross sectional front view of the drive transmission mechanism employing three feed screw shafts.

(3) Another alternative design is to have three or more than three feed screw shafts depending upon the weight of the table 16 and work both combined. FIG. 6 shows the case where three feed screw shafts 20A, 20B, 20C are had; in this case it would be desirable to arrange the axis of these three shafts along the circle and to mount the identical gears 28A, 28B, 28C on the ends of the shafts respectively and to have a pinion gear 30a, that is set to mesh with all three gears 28A, 28B, 28C, connected to the output shaft of the X-direction motor. By this configuration, the synchronize rotational motion of the three screw shafts 20A, 20B, 20C with the single driver (the X-direction motor) can be easily realized.

Comparison Results

In Table 1, there are three test samples to be compared with each other; (a) a first comparison sample; a conventional feed mechanism with a single feed screw shaft of 90 mm in dia; (b) a second comparison sample; a feed mechanism with a single feed screw shaft of 125 mm in dia such that the deflection amount can be roughly halved under the subjection of the same load and (c) a feed mechanism of this invention; a feed mechanism with two feed screw shafts each of 90 mm in dia. With these three test samples, a moment load of a motor for driving each of the items is obtained by calculating the moment of inertia for each test samples needed to be driven and is tabulated in the table as follows:

TABLE 1

|  | Comparison Sample 1 | Comparison Sample 2 | This Invention |
|---|---|---|---|
| Dia (in mm) of A Feed Screw Shaft | 90 | 125 | 90 |
| The number of Feed Screw Shaft(s) | 1 | 1 | 2 |
| Motor load corresponding to a moment of inertia of the feed screw shaft(s). (kgf-cm-s$^2$) | 0.0934 | 0.3408 | 0.1867 |
| Motor load corresponding to a moment of inertia of the gear(s). (kgf-cm-s$^2$) | 0.0713 | 0.0713 | 0.0782 |
| Total Moment Load (kgf-cm-s$^2$) | 0.1647 | 0.4121 | 0.2649 |
| Ratio of total Moment load | 100% | 250% | 161% |

Note that:

A length corresponding to a threaded portion of the feed screw shaft is 6,397 mm:

A diameter of each bearing housing is 65 mm;

A depth of each bearing housing is 627 mm;

A deflection amount in the longitudinal direction of the feed screw shaft of comparison example 2 is substantially the same as that of each feed screw shaft of this invention.

From the Table 1, it can be observed that with the use of feed shaft in comparison example 2, the deflection amount of the feed screw shaft can be reduced whereas a sharp increase of the total moment load subjected to the motor can not be avoided (2.5 times of the comparison example 1), thus it may no longer be possible to use the motor that is readily available on the market, resulting in procurement of the customized motor with a greater power that is usually much more expensive than the conventional one on the market.

With the use of inventive structure, it can suppress the deflection amount of the feed screw shaft to the level achieved with the use of the comparison example 2 while maintaining the total moment load subjected to the motor at a certain low level (in this example 1.6 times of the comparison example 1). Thus the moment load does not necessitate the procurement of the larger sized motor.

Although preferred embodiments of the present invention have been fully described with reference to the accompanied drawings, it is to be understood that various changes and modifications will be apparent to those skilled in the art. Therefore, unless otherwise such changes and modifications depart from the spirit and scope of the invention, they should be construed as being included therein.

What is claimed is:

1. A table feed mechanism for a machine tool, comprising:
    a bed;
    a table slidably mounted on the bed for mounting a work thereon, said table carrying structure defining at least two parallel screw holes therein;
    at least two feed screw shafts arranged parallel to one another, each of said at least two feed screw shafts being engageable with a corresponding one of said at least two screw holes; and
    a drive operable to rotate said at least two feed screw shafts simultaneously to move the table codirectionally with a longitudinal direction of said at least two feed screw shafts.

2. The table feed mechanism according to claim 1 wherein there are two of said threaded feed shafts having parallel longitudinal axes.

3. The table feed mechanism according to claim 1 wherein there are three of said threaded feed shafts having parallel longitudinal axes.

4. The table feed mechanism according to claim 1, wherein the drive comprises a pinion gear and a gear fixedly mounted to the end of each of said at least two feed screw shafts for engaging with the pinion gear, said drive further comprising a driving component to rotatably drive the pinion gear for moving the table.

5. The table feed mechanism according to claim 4, wherein the feed screw shafts are oriented in a horizontal manner.

6. A table feed mechanism for a machine tool, comprising:
    a bed;
    a table slidably mounted on the bed for mounting a work thereon, said table carrying structure defining parallel screw holes therein;
    feed screw shafts arranged parallel to one another, each of said feed screw shafts being engageable with a respective one of said screw holes; and
    drive means for simultaneously driving said plurality of feed screw shafts to move the table codirectionally with a longitudinal direction of said feed screw shafts, said drive comprising a pinion gear and a gear fixedly mounted to the end of each feed screw shaft for engaging with the pinion gear, said drive means further comprising a driving component to drive the pinion gear for moving the table, wherein the pinion gear is in the form of a double gear having a first pinion on one end and a second pinion on the other end and the gear fixedly mounted to the end of each feed screw shaft is engageable with the first pinion and the driving component drives the second pinion gear.

7. A table feed apparatus for a machine tool comprising:

a bed;

a table slidably mounted on the bed for mounting a work thereon, said table having threaded holes each having a longitudinal axis, at least two of said threaded holes having parallel longitudinal axes;

at least two threaded feed shafts having parallel longitudinal axes parallel to the longitudinal axes of said at least two threaded holes, each of said at least two threaded feed shafts threadedly engaging a respective one of said at least two threaded holes; and a drive mechanism for rotatably driving each of the at least two feed screws simultaneously to thereby effect movement of said table in a direction parallel to the longitudinal axes of said at least two feed shafts.

8. A table feed mechanism according to claim 7 wherein said table includes a further threaded hole having a longitudinal axis extending perpendicular to the longitudinal axes of said at least two threaded holes, a further threaded feed shaft having a longitudinal axis perpendicular to said parallel longitudinal axes of said at least two threaded feed shafts, said further feed shaft threadedly engaging said further threaded hole in said table, and a further drive mechanism for rotatably driving said further feed screw to thereby effect movement of said table in a direction perpendicular to the direction of movement of the table effected by said at least two feed screws.

9. A table feed mechanism for a machine tool, comprising:

a bed;

a table slidably mounted on the bed for mounting a work thereon, said table having threaded holes each having a longitudinal axis, at least two of said threaded holes having parallel longitudinal axes;

at least two threaded feed shafts having parallel longitudinal axes codirectional with the longitudinal axes of said at least two threaded holes, each of said at least two threaded feed shafts threadedly engaging a respective one of said at least two threaded holes; and a drive mechanism for driving each of the at least two feed screws simultaneously to thereby effect movement of said table in a direction parallel to the longitudinal axes of said at least two feed shafts, wherein said drive mechanism comprises a shaft gear fixedly mounted on each of said at least two feed shafts, a first and a second pinion gear fixedly mounted on a pinion shaft, said first pinion simultaneously engaging each of said shaft gears on each of said at least two feed shafts, and a driving component driving said second pinion.

10. A table feed apparatus for a machine tool comprising:

a bed;

a table slidably mounted on the bed for mounting a work thereon, said table having threaded holes each having a longitudinal axis, at least two of said threaded holes having parallel longitudinal axes;

at least two threaded feed shafts having parallel longitudinal axes which are codirectional with the longitudinal axes of said at least two threaded holes, each of said at least two threaded feed shafts threadedly engaging a respective one of said at least two threaded holes;

a first drive mechanism for rotatably driving each of the at least two feed screws simultaneously to thereby effect movement of said table codirectionally with the longitudinal axes of said at least two feed shafts;

said table including a further threaded hole having a longitudinal axis extending perpendicular to the longitudinal axes of said at least two threaded holes;

a further threaded feed shaft having a longitudinal axis perpendicular to said parallel longitudinal axes of said at least two threaded feed shafts, said further feed shaft threadedly engaging said further threaded hole in said table; and a second drive mechanism for rotatably driving said further feed screw to thereby effect movement of said table in a direction perpendicular to the direction of movement of the table effected by said at least two feed screws.

11. A table feed mechanism for a machine tool, comprising:

a bed;

a table slidably mounted on the bed for mounting a work thereon, said table having threaded holes each having a longitudinal axis, at least two of said threaded holes having parallel longitudinal axes;

at least two threaded feed shafts having parallel longitudinal axes codirectional with the longitudinal axes of said at least two threaded holes, each of said at least two threaded feed shafts threadedly engaging a respective one of said at least two threaded holes;

a first drive mechanism for driving each of the at least two feed screws simultaneously to thereby effect movement of said table codirectionally with the longitudinal axes of said at least two feed shafts;

said table including a further threaded hole having a longitudinal axis extending perpendicular to the longitudinal axes of said at least two threaded holes;

a further threaded feed shaft having a longitudinal axis perpendicular to said parallel longitudinal axes of said at least two threaded feed shafts, said further feed shaft threadedly engaging said further threaded hole in said table; and a second drive mechanism for driving said further feed screw to thereby effect movement of said table in a direction perpendicular to the direction of movement of the table effected by said at least two feed screws, wherein said first drive mechanism comprises a shaft gear fixedly mounted on each of said at least two feed shafts, a first and a second pinion gear fixedly mounted on a pinion shaft, said first pinion simultaneously engaging each of said shaft gears on each of said at least two feed shafts, and a driving component driving said second pinion.

12. A table feed mechanism for a machine tool, comprising:

a bed having a pair of guide portions extending along a first direction;

a table having lateral ends along a second direction which is perpendicular to the first direction, the table being slidably mounted on the bed along the first direction for mounting a work thereon, said table including at least two parallel screw holes formed therein laterally inward from said lateral ends of the table, said lateral ends of the table being slidably supported by the guide portions;

at least two feed screw shafts each engageable with a respective one of said at least two screw holes; and a drive operable to simultaneously rotate said at least two feed screw shafts to move the table codirectionally with a longitudinal direction of said at least two feed screw shafts.

* * * * *